(12) United States Patent
Hartman et al.

(10) Patent No.: US 6,576,174 B1
(45) Date of Patent: Jun. 10, 2003

(54) RESIDUAL GAS EXTRACTION PROCESS

(75) Inventors: Hermann David Hartman, Tottenham (CA); Steven David Hartman, Erin (CA)

(73) Assignee: Industrial Thermo Polymers Limited, Brampton (CA)

( * ) Notice: Subject to any disclaimer, the term of this patent is extended or adjusted under 35 U.S.C. 154(b) by 0 days.

(21) Appl. No.: 09/491,873

(22) Filed: Jan. 27, 2000

(51) Int. Cl.[7] ............................................. B29C 71/00
(52) U.S. Cl. ........................ 264/102; 264/321; 264/344
(58) Field of Search ................................ 264/101, 102, 264/51, 53, 321, 344

(56) References Cited

U.S. PATENT DOCUMENTS

| | | | |
|---|---|---|---|
| 2,697,255 A | | 12/1954 | Lindemann |
| 3,235,640 A | | 2/1966 | Carton et al. |
| 3,704,083 A | * | 11/1972 | Phipps ........................ 264/101 |
| 4,272,469 A | * | 6/1981 | Smith ........................... 264/53 |
| 4,298,322 A | | 11/1981 | Anders et al. |
| 4,687,702 A | * | 8/1987 | Monsees .................. 428/308.4 |
| 5,059,376 A | * | 10/1991 | Pontiff et al. ............... 264/344 |
| 5,086,078 A | * | 2/1992 | Harclerode et al. ........... 264/53 |
| 5,120,481 A | * | 6/1992 | Brackman et al. ............. 264/53 |
| 5,287,634 A | | 2/1994 | Hain et al. |
| 5,306,132 A | | 4/1994 | Grundmann et al. |
| 5,399,592 A | * | 3/1995 | Park ............................. 264/53 |
| 5,411,689 A | * | 5/1995 | Lee et al. ....................... 264/53 |
| 5,442,041 A | * | 8/1995 | Mallikarjun et al. ......... 264/101 |
| 5,672,304 A | * | 9/1997 | Keilert et al. ................ 264/102 |
| 5,925,450 A | * | 7/1999 | Karabedian et al. .......... 264/51 |
| 5,962,545 A | * | 10/1999 | Chaudhary et al. .......... 521/146 |
| 6,054,078 A | * | 4/2000 | Lauer et al. ................. 264/45.9 |
| 6,153,293 A | * | 11/2000 | Dahl et al. ................... 264/45.3 |
| 6,245,267 B1 | * | 6/2001 | Kreiser et al. ............... 264/102 |

FOREIGN PATENT DOCUMENTS

| | | |
|---|---|---|
| DE | 39 00 441 A | 7/1990 |
| EP | 0 672 708 A | 9/1995 |
| GB | 2 093 758 * | 9/1982 |
| WO | WO 88 00114 A | 1/1988 |

OTHER PUBLICATIONS

Database WPI Section Ch, Week 198508 Derwent Publications Ltd., London, GB: AN 1985–046615 XP002144190 & JP 60 004038 A (Sanwa Kako CO), Jan. 10, 1985 abstract.

* cited by examiner

*Primary Examiner*—Allan R. Kuhns
(74) *Attorney, Agent, or Firm*—Eugene J. A. Gierczak

(57) ABSTRACT

A method and apparatus for reducing residual gases from a foamed polymer material by subjecting the foamed polymer material to a vacuum.

23 Claims, 2 Drawing Sheets

RESIDUAL GAS EXTRACTION PROCESS

FIELD OF THE DESCRIPTION

This invention relates generally to a method and apparatus for reducing residual gases from a foamed polymer material, and particularly comprises a method and apparatus for accelerating the diffusion of isobutane gas from foamed plastic material.

BACKGROUND OF INVENTION

There has been a proliferation of the introduction of foamed polymer products into the marketplace including the manufacture and sale of extruded tubes for insulation, foamed rods, water toys commonly referred to as "noodles" and foams for packaging and paddings and upholstery material. Generally speaking such products are extruded through an extruder die. In particular the foamed polymer can comprise of a variety of substances including polyethylene or the like. A foaming agent is generally included with the polymer material in order to cause the extruded part to expand as it leaves the extruder die to a preselected size.

A variety of foaming materials can be used, the most common of which includes isobutane gas that is mixed with the thermo plastic material such as polyethylene so as to produce a foamed thermo plastic extruded profile as it exits through the extruder die. The isobutane gas is introduced to cause the material to foam or expand outwardly to produce the excellent insulating qualities of the insulating tube as well as the high buoyancy of the water toys referred to above.

Isobutane gas is used because of its inexpensive nature as well as versatility in the manufacturing process. However, the isobutane gas is highly volatile and explosive if subjected to a spark or fire and accordingly such foamed thermo plastic materials are generally warehoused for approximately 10 days or more.

During these 10 days or more the isobutane gas diffuses outwardly and dissipates from the foamed thermo plastic material while atmospheric gases diffuse back into the thermo plastic material to replace the isobutane gas which has left. Accordingly manufacturers of foamed thermo plastic materials utilizing volatile organic compounds such as isobutane must generally include large warehousing facilities to "age" the foamed thermo plastic material so as to reduce the possibility of explosions during transport of the foamed thermo plastic materials to the distributors and ultimate users. After the 10 days there is still some residual isobutane gas contained within the product but it is at a much lower level.

Therefore generally speaking the industry has warehoused the foamed thermo plastic materials for approximately 10 days or more before shipping same. The foamed thermo plastic materials can be shipped in ventilated transport trucks so as to further ventilate the diffusion of isobutane gas from the foamed thermo plastic materials. There have been a number of instances in the marketplace where transport trucks have exploded due to accidental introduction of spark or flame since isobutane gas is generally heavier than air and may explode if a truck driver stops to light a cigarette or the like.

Manufacturers in the industry have attempted to control the diffusion of the volatile organic compound such as isobutane or the like through the use of additives such as glycerol monsterate an hydrogenated vegetable oil or the like. The use of such diffusion control agents are carefully controlled since too much or too little of the diffusion control agent can cause wrinkling in the surface of the foamed thermo plastic material as well as shrinkage in the cross-section of the thermo plastic foam material.

Accordingly there is a need for an improved method of accelerating the diffusion of residual gases such as isobutane or the like.

Various attempts have heretofore been made in the prior art to evacuate gasses from an extrusion process. For example, U.S. Pat. No. 5,306,132 teaches a process and a degassing unit for the degassing of plastic melt in a screw extruder in which a surface of the degassing unit facing the screws of the extruder are heated to prevent deposition of entrained plastic particles, particularly at the corners or edges of the degassing unit. Prior to the commencement of the treatment process, the degassing unit is heated to a temperature which is at least as high as the melting point of the plastic to be treated. Heating can be effected by conveying a heating medium through a channel in the degassing unit located in proximity to the surface facing the extrusion screws and especially the corner or edge regions.

U.S. Pat. No. 5,287,634 teaches removal of vaporizable components from polymeric products. More particularly, undesirable vaporizable components are removed from biomedical polymeric products. Heated nitrogen gas is supplied to an evenly distributed within and around a heated chamber having biomedical polymeric products contained therein. The heated gas is introduced into the chamber through omnidirectional multi-point source dispersion means. The products are rotated about an axis to further evenly distribute the heated gas over the surface of the product. The heated gas vaporizes vaporizable components and carries them to a collection area where the vaporizable components are deposited.

U.S. Pat. No. 4,298,322 teaches venting means for a screw extruder, particularly for thermo-plastics material, which venting means comprises a substantially vertical venting shaft communicating with the bore of a cylinder of the extruder and coupled to a low pressure source by a pipe, a pivotable flap which is moved from its normal position shown, when acted upon by plastics melt being extruded and rising in the shaft due to malfunction of the extruder, to cover the end of the pipe and prevent the melt passing into the pipe.

U.S. Pat. No. 3,325,640 teaches a method of processing a plastic material comprising the steps of maintaining a vacuum in said working space, whereby positively to expel from out of the material and draw out of the working space any gaseous and volatile inclusions present in the material as such inclusions are presented to said exposed boundary surface.

U.S. Pat. No. 2,697,255 teaches a process for removing by diffusion through the walls of the closed cells a major portion of the gas from the gas-containing cells of a cellular thermoplastic body thereby contracting the thermoplastic body and increasing the specific gravity thereof thus forming a stable thermoplastic body. A process of dimensionally stabilizing and increasing the specific gravity of expanded, gas-containing, closed-cell, cellular bodies of natural and synthetic elastomers and thermoplastic resins, comprising the steps of slicing a completely expanded, closed cell, gas-containing cellular body into thin slices of the same; heating said thin slices to a temperature above the heat distortion temperature and below the softening point of said cellular body until a portion of the gas contained in the closed cells of said cellular body diffuses into the surrounding atmosphere, thereby decreasing the gas content of said closed cells and causing said cellular body to contract, thus forming a dimensionally stable closed-cell, cellular body having the specific gravity thereof increased in comparison with the specific gravity of the original cellular body.

It is also an object of this invention to provide a method of reducing the warehousing time in the "aging" foamed thermo plastic materials from approximately 10 days down to two days.

It is also an object of this invention to provide an improved method and apparatus for improving the safe transport of the foamed thermo plastic materials.

It is also an object of this invention to provide an improved method and apparatus for the capture and reclaim or destruction of these residual gases.

These and other objects and features of the invention shall now be described in relation to the following drawings.

SUMMARY OF THE INVENTION

It is an aspect of this invention to provide a method of reducing residual gases from a foamed polymer material by subjecting said foamed polymer material to a vacuum.

In accordance with yet another aspect of the invention, to provide a method of accelerating the diffusion of volatile isobutane gas from a foamed extruded product comprising extruding a thermo plastic material with isobutane gas so as to produce said foamed thermo plastic material; placing said foamed thermo plastic material in a vacuum chamber; subjecting said foamed thermo plastic material to a vacuum for a time duration of between 10 and 20 minutes at a vacuum of about 28 inches mercury so as to accelerate the diffusion of isobutane gas; then drawing said isobutane gas from said vacuum chamber.

It is a further aspect of this invention to provide an apparatus for reducing residual gases from foamed polymer materials using a vacuum chamber.

BEST MODE OF CARRYING OUT THE INVENTION

Figure 1:
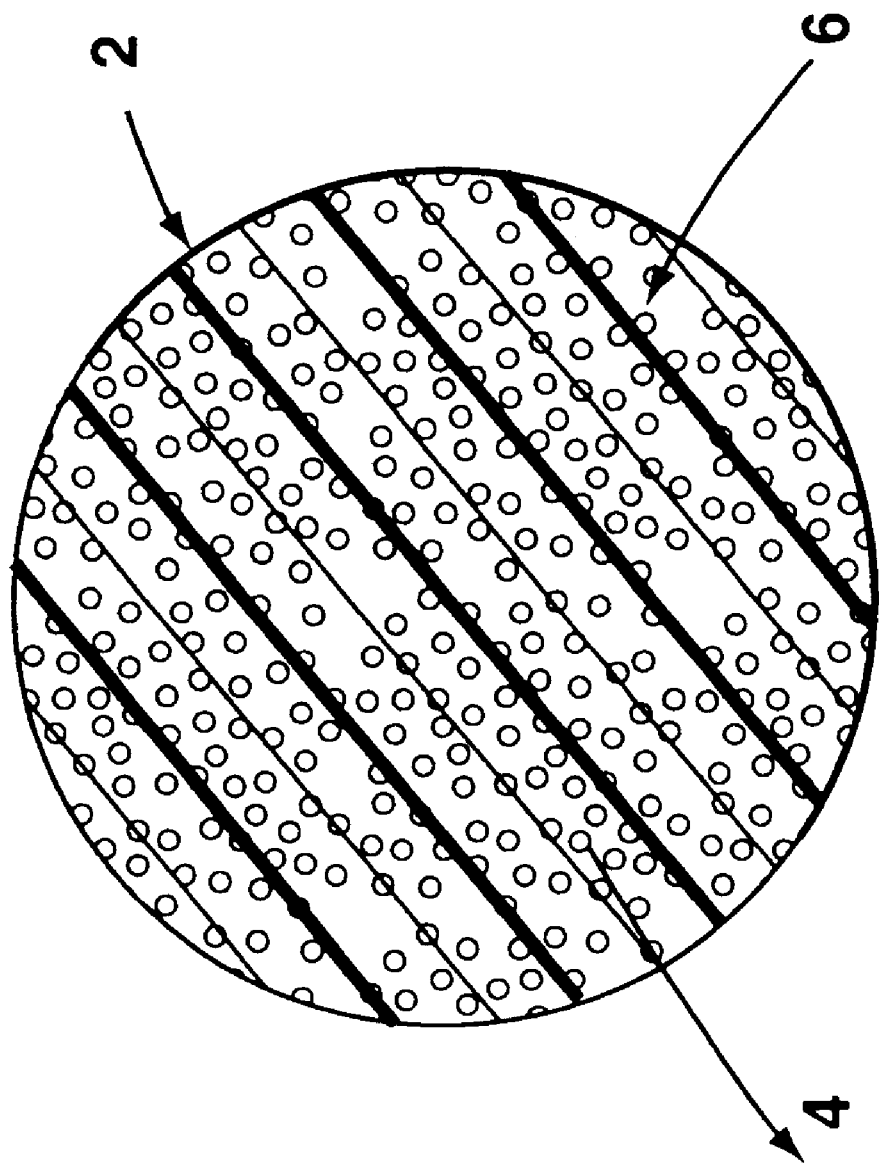
FIG. 1 is a cross-sectional area of a foamed thermo plastic material illustrated diffusion of volatile organic compounds.

In the description which follows, like parts are marked throughout the specification and the drawings with the same respective reference numerals. The drawings are not necessarily to scale and in some instances proportions may have been exaggerated in order to more clearly depict certain features of the invention.

Various embodiments of the invention have now been described in detail. Since changes in and/or additions to the above-described best mode may be made without departing from the nature, spirit or scope of the invention, the invention is not to be limited to said details.

FIG. 1 is illustrative of the cross-sectional area of an extruded tube of foamed thermo plastic material. FIG. 1 generally illustrates a circular cross-section although any desired cross-section may be produced by an extruded die such as square, sheet, plank, triangular, helical or the like in a manner well known to those persons skilled in the art. Generally speaking the foamed thermo platic material is produced in an extruder die by mixing a suitable thermo plastic material such as polyethylene with a suitable foaming agent such as isobutane which causes the extruded material to exit the extruder die and foam outwardly.

Persons skilled in the art generally theorize that as the foamed thermo plastic material exits the extruded die a plurality of cell membranes are produced by the process.

The foaming process in the extruded thermo plastic material is caused by the mixing and exiting of the volatile organic compounds such as isobutane or the like.

Once the foamed thermo plastic material is formed, the volatile organic gas 4 diffuses outwardly from the extruded tube 2. Generally speaking the industry has adapted a rule of thumb of "aging" or warehousing the foamed thermo plastic material for approximately 10 days before shipping same in order to allow ample time for the volatile organic gas to diffuse outwardly. Atmospheric gases 6 diffuse inwardly into the foamed thrown plastic material 2 to take the place of the volatile organic gases. Thereafter the foamed thermo plastic material 2 is transported in vented trucks.

Figure 2:
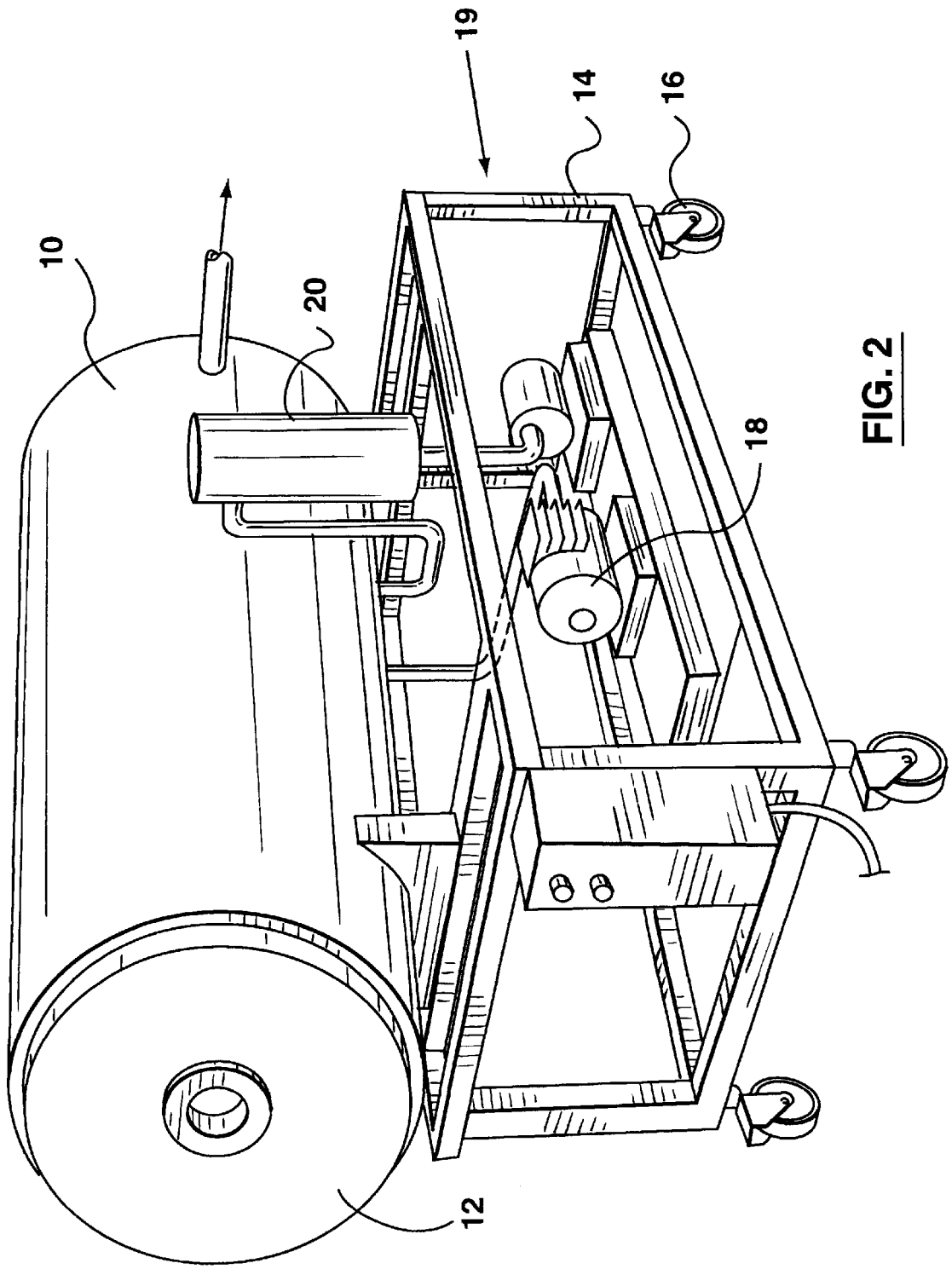
FIG. 2 is a photograph of the vacuum apparatus.

FIG. 2 illustrates one aspect of this invention which includes a vacuum chamber 10 with swingable door 12 having a window in the door 12 as shown in FIG. 2.

It has been found that by placing foamed thermo plastic material such as polyethylene which has been foamed with isobutane within the vacuum chamber 10 the diffusion of isobutane gas from the foamed backing material may be accelerated.

For example without restricting the generality of the invention described herein it was found that by introducing foamed polyethylene into the vacuum chamber 10 for approximately 10 to 20 minutes at a vacuum of 28 inches mercury at ambient temperature approximately 60 percent of the volatile organic compound (isobutane gas) diffused from the foamed thermo plastic material. Such a process represents approximately eight days of diffusion compared to just plain warehousing as described above. More particularly by introducing the foamed thermo plastic material into the vacuum chamber 10 for the time duration outlined in the example above the foamed thermo plastic material could then be withdrawn from the vacuum chamber 10 and warehoused for only two days. This represents a substantial improvement over the requirement of warehousing space since the manufacturer now requires space to accommodate the foamed thermo plastic material for only two days verses the 10 days referred to in the prior art.

The diffusion of the isobutane gas could be readily observed by filling the vacuum chamber 10 partially with water and submerging the foamed product within the water and then applying the vacuum referred to earlier. Such experimental observation illustrated clearly the diffusion or bubbling of the isobutane gas through the water and into the chamber. It was also observed that the rate of bubbling or diffusion could be controlled by controlling the level of vacuum. The greater the vacuum the higher the rate of diffusion. However the rate of vacuum or diffusion must be controlled so as not to cause appreciable wrinkling of the surface of the foamed material which can occur if the vacuum is too high. Accordingly the rate of diffusion can be controlled by the time duration and level of vacuum.

Furthermore a cross-section of the extruded thermo plastic material has a bearing on the rate of diffusion as a hollow structure such as a hollow tube would have a higher rate of diffusion of isobutane gas than a solid core.

Generally speaking the method described herein involves placing the foamed thermo plastic material into the vacuum chamber without submerging the foamed thermo plastic material in water. The water was introduced only to visually show the diffusion of the isobutane gas.

Moreover FIG. 2 also illustrates that the vacuum chamber 10 is mobile since vacuum chamber 10 sits on a frame 14 with wheels 16. A motor 18 is utilized to produce the vacuum and the dewatering cylinder 20 is shown to remove water and the like.

Moreover the vacuum chamber can include means to draw off the isobutane gas which can either be collected and condensed back into a liquid or the like to be recycled back into the foaming process or may be drawn off and utilized as a heating source to heat a room or the like. This represents an improvement over the prior art where the volatile organic compound such as isobutane are vented to the atmosphere. Accordingly the method utilized herein is more environmentally friendly than heretofore used in the extrusion of foamed thermo plastic material.

Moreover the vacuum occurs at ambient temperature but the temperature of the process may be increased which will generally result in a faster diffusion rate of the isobutane gas.

As referred to earlier the prior art utilizes diffusion control agents such as glycerol monosterate a hydrogenated vegetable oil. Generally speaking the utilization of the vacuum method described herein may require less use of such diffusion control agents.

Accordingly the method described herein accelerates the leaching process of residual gases such as isobutane or the like. Such operation will be conducted in a batch process although the vacuum cylinder 10 may include conveyor belts (not shown) to speed up the introduction and withdrawal of the foamed thermo plastic material into the vacuum chamber 10.

Accordingly the method of accelerating the diffusion of volatile isobutane gas from the foamed polyethylene extrusion material consists of the steps of:

1. extruding the polyethylene material with isobutane gas so as to produce a foamed polyethylene foamed material;
2. placing the foamed polyethylene material in a vacuum chamber;
3. subjecting the foamed polyethylene material to a vacuum for a time duration of between 10 and 20 minutes at a vacuum of about 28 inches so as to accelerate the diffusion of the isobutane gas;
4. then drawing the isobutane gas from the vacuum chamber to reclaim same and introduce it back into the extruder or to burn same.

The advantages of utilizing the method and apparatus described above include:

1. reducing warehousing space since the foamed polyethylene material could be shipped within two days after manufacturing rather than the 10 days utilized before;
2. it is generally cheaper to utilize vacuum systems than to increase warehousing space;
3. the isobutane gas may be reclaimed and used again in the extruded process or burned in a furnace for heat;
4. method is safer by reducing the content of flammable volatile isobutane gas.

Although the preferred embodiment as well as the operation and use have been specifically described in relation to the drawings, it should be understood that variations in the preferred embodiment could be achieved by a person skilled in the trade without departing from the spirit of the invention as claimed herein. Moreover the reference to two (2) days warehousing rather than 10 days has been used as an example and the invention should not be limited thereby. Furthermore the invention described herein describes subjecting the foamed polymer to a vacuum of 28 inches for 10 to 20 minutes by way of example only. The vacuum could be more or less and the time duration more or less. Moreover acceptable results can be reached by utilzing a lower vacuum but subjecting the foamed polymer for a longer duration of time to the vacuum.

We claim:

1. A method for reducing residual gases from a foamed thermo polymer material after removal from an extruder by subjecting said foamed thermo polymer material to a vaccum in a batch process, wherein said vacuum is conducted at ambient temperatures and controlling the duration of time that said foamed thermo polymer material is subjected to the batch process so as to control the rate of diffusion of said residual gases from said foamed thermo polymer material.

2. A method as claimed in claim 1 wherein the residual gas comprises isobutane gas.

3. A method as claimed in claim 2 wherein said foamed polymer is subjected to a vacuum up to 20 minutes.

4. A method as claimed in claim 2 wherein said foamed thermo polymer material is subjected to a vacuum up to 10 minutes.

5. A method as claimed in claim 1 wherein said foamed thermo polymer material is subjected to a vacuum for between 10 and 20 minutes.

6. A method as claimed in claim 1 wherein said foamed thermo plastic polymer material is placed in a moveable vacuum chamber.

7. A method as claimed in claim 6 wherein said foamed thermo polymer material is placed in a vacuum chamber without submerging said foamed thermo polymer in water.

8. A method as claimed in claim 1 further including the step of controlling the level of vacuum and time duration that the foamed thermo polymer material is subjected to the vacuum so as to minimize wrinkling of the surface of said foamed thermo polymer material.

9. A method as claimed in claim 8 further including the step of controlling the temperature of subjecting said foamed material to said vacuum so as to increase the rate of diffusion of said residual gas by increasing the temperature.

10. A method for reducing residual gas from a foamed thermo polymer material after removal from an extruder comprising:
    (a) subjecting said foamed thermo polymer material to a vacuum in a batch process;
    (b) subjecting said foamed thermo polymer material to a vacuum for up to 20 minutes; and
    (c) conducting said vacuum at 28 inches mercury.

11. A method as claimed in claim 10 wherein said residual gas is reduced by up to sixty percent or more.

12. A method as claimed in claim 10 wherein said residual gas is reclaimed.

13. A method as claimed in claim 10 wherein said residual gas comprises pentane or isobutane.

14. A method as claimed in claim 10 wherein said residual gas comprises propane.

15. A method of accelerating the diffusion of volatile isobutane gas from a foamed extruded product comprising:
    (a) extruding a thermo plastic material with isobutane gas through an extruder so as to produce said foamed plastic product;
    (b) removing said foamed thermo plastic product from said extruder;
    (c) placing said foamed thermo plastic product in a moveable vacuum chamber;

(d) subjecting said foamed thermo plastic product to a vacuum for a time duration up to 20 minutes and wherein said vacuum is conducted up to 28 inches mercury, so as to accelerate the diffusion of isobutane gas;

(e) then drawing said isobutane gas from said vacuum chamber;

(f) removing said foamed thermo plastic product from said vacuum chamber.

16. A method as claimed in claim 15 wherein said vacuum is conducted at ambient temperatures.

17. A method as claimed in claim 16 wherein said drawn isobutane gas is reclaimed.

18. A method as claimed in claim 15 wherein said vacuum is conducted at temperatures above ambient.

19. A method as claimed in claim 15 wherein said time duration is between 10 and 20 minutes and vacuum is conducted at approximately 28 inches mercury.

20. A method as claimed in claim 15 wherein said foamed thermo plastic product is placed in said vacuum chamber to accelerate said diffusion of isobutane gas in a batch operation so as to reduce the time duration of warehousing of said foamed thermo plastic product.

21. A method of accelerating the diffusion of volatile isobutane gas from foamed extruded product comprising:

(a) extruding a thermo plastic material with isobutane gas so as to produce said foamed thermo plastic product;

(b) placing said foamed thermo plastic product in a vacuum chamber;

(c) subjecting said foamed thermo plastic product to a vacuum for a time duration and vacuum sufficient so as to accelerate the diffusion of isobutane gas;

(d) then drawing said isobutane gas from said vacuum chamber wherein said drawn isobutane gas is oxidized so as to heat a room.

22. A method as claimed in claim 21 further including withdrawing said foamed thermo plastic product from said vacuum chamber after drawing said isobutane gas.

23. A method as claimed in claim 22 including warehousing said foamed thermo plastic product for approximately 48 hours before shipping said polymer material.

* * * * *